(12) United States Patent
Zachut et al.

(10) Patent No.: US 8,232,977 B2
(45) Date of Patent: Jul. 31, 2012

(54) SYSTEM AND METHOD FOR DETECTION WITH A DIGITIZER SENSOR

(75) Inventors: Rafi Zachut, Rishon-LeZion (IL); Meir Morag, Savyon (IL); Amir Kaplan, Hod-HaSharon (IL)

(73) Assignee: N-trig Ltd., Kfar-Saba (IL)

( * ) Notice: Subject to any disclaimer, the term of this patent is extended or adjusted under 35 U.S.C. 154(b) by 862 days.

(21) Appl. No.: 12/269,971

(22) Filed: Nov. 13, 2008

(65) Prior Publication Data

US 2009/0127005 A1 May 21, 2009

Related U.S. Application Data

(60) Provisional application No. 60/996,371, filed on Nov. 14, 2007.

(51) Int. Cl.
*G06F 3/045* (2006.01)
(52) U.S. Cl. .................................. 345/174; 345/173
(58) Field of Classification Search ........... 345/173–183
See application file for complete search history.

(56) References Cited

U.S. PATENT DOCUMENTS

| | | | |
|---|---|---|---|
| 7,372,455 B2 * | 5/2008 | Perski et al. | 345/173 |
| 2006/0097991 A1 | 5/2006 | Hotelling et al. | |
| 2007/0062852 A1 * | 3/2007 | Zachut et al. | 209/683 |
| 2008/0158167 A1 | 7/2008 | Hotelling et al. | |

FOREIGN PATENT DOCUMENTS

JP 2002-342033 11/2002

OTHER PUBLICATIONS

Rekimoto "SmartSkin: An Infrastructure for Freehand Manipulation on Interactive Surfaces", CHI 2002, Minneapolis, Minnesota, USA, Apr. 20-25, 2002, 4(1): 113-120, 2002.

* cited by examiner

*Primary Examiner* — Quan-Zhen Wang
*Assistant Examiner* — Troy Dalrymple

(57) ABSTRACT

A method for detection on a digitizer sensor, the method comprises simultaneously transmitting orthogonal signals having the same frequency on at least two conductors of a digitizer sensor; sampling a signal on at least one other conductor crossing the at least two conductors, wherein the signal is responsive to capacitive coupling at cross-junctions formed between the at least two conductors and at least one other conductor; decomposing the sampled signal into orthogonal components; and analyzing the orthogonal components to detect user interaction at each cross junction.

32 Claims, 12 Drawing Sheets

ND METHOD FOR DETECTION WITH A DIGITIZER SENSOR

SYSTEM AND METHOD FOR DETECTION WITH A DIGITIZER SENSOR

RELATED APPLICATION

The present application claims the benefit under section 35 U.S.C. §119(e) of U.S. Provisional Application No. 60/996,371 filed on Nov. 14, 2007 which is incorporated herein by reference in its entirety.

FIELD OF THE INVENTION

The present invention relates to digitizer systems, and, more particularly, but not exclusively, to interrogation of digitizer sensor lines for touch detection.

BACKGROUND OF THE INVENTION

Touch technologies are commonly used as input devices for a variety of products. The usage of touch devices of various kinds is growing sharply due to the emergence of new mobile devices such as Personal Digital Assistants (PDA), tablet PCs and wireless Flat Panel Display (FPD) screen displays. These new devices are usually not connected to standard keyboards, mice or like input devices, which are deemed to limit their mobility. Instead there is a tendency to use touch sensitive digitizers of one kind or another. A stylus and/or fingertip may be used as a user input.

U.S. Pat. No. 7,372,455, entitled "Touch Detection for a Digitizer" assigned to N-Trig Ltd., the contents of which is incorporated herein by reference, describes a detector for detecting both a stylus and touches by fingers or like body parts on a digitizer sensor. The detector typically includes a digitizer sensor with a grid of sensing conductive lines, a source of oscillating electrical energy at a predetermined frequency, and detection circuitry for detecting a capacitive influence on the sensing conductive line when the oscillating electrical energy is applied, the capacitive influence being interpreted as a touch. The detector is capable of simultaneously detecting multiple finger touches.

US Patent Application Publication No. 20070062852, entitled "Apparatus for Object Information Detection and Methods of Using Same" assigned to N-Trig Ltd., the contents of which is incorporated herein by reference, describes a digitizer sensor and/or touchscreen sensitive to capacitive coupling and objects adapted to create a capacitive coupling with the sensor when a signal is input to the sensor. In some embodiments, the digitizer sensor includes a series of activated electrodes and passive electrodes. An AC signal, e.g. a pulsed AC signal, sequentially activates each of the activated electrodes. In response to each AC signal applied, a signal is transferred, by capacitive coupling, to each of the passive electrodes. The presence of a finger or an object typically alters the signal transferred to some of the passive electrodes. These signals are analyzed to determine the position/orientation/identification etc.

In some exemplary embodiments described in this reference, to speed up report rate, the active electrodes are divided into a number of groups wherein the active electrodes in each group are activated sequentially but the groups work simultaneously. This is accomplished by applying AC signals with non-mutually interfering (orthogonal) frequencies to each of the groups working simultaneously.

US Patent Application Publication Number US20060097991, entitled "Multipoint Touchscreen", the contents of which is incorporated herein by reference, describes a touch screen having a transparent capacitive sensing medium to detect multiple touches or near touches that occur at the same time and at distinct locations. The touch screen includes a first set of lines that are electrified and a second set of lines crossing the first set that sense signals coupled by capacitive coupling at each of the nodes formed by the crossing lines. A multiplexer sequentially releases a signal to each of the lines of the first set. In response to each signal released, output is sampled from the second set of lines.

SUMMARY OF THE INVENTION

An aspect of some embodiments of the present invention is the provision of a method for speeding up report rate of a digitizer sensor. According to some embodiments of the present invention, the method provides for simultaneously activating two electrodes and/or conductors of a digitizer sensor with orthogonal signals having the same frequency. As used herein the term orthogonal signals refer to signals having scalar product that is substantially zero.

An aspect of some embodiments of the present inventions is the provision of a method for detection on a digitizer sensor, the method comprising: simultaneously transmitting orthogonal signals having the same frequency on at least two conductors of a digitizer sensor; sampling a signal on at least one other conductor crossing the at least two conductors, wherein the signal is responsive to capacitive coupling at cross-junctions formed between the at least two conductors and at least one other conductor; decomposing the sampled signal into orthogonal components; and analyzing the orthogonal components to detect user interaction at each cross junction.

Optionally, the method comprises detecting a position of the user interaction on the digitizer sensor.

Optionally, the orthogonal signals are orthogonal in phase.

Optionally, the decomposing is performed by orthogonal phase detectors.

Optionally, the method comprises estimating a phase shift of the transmitted signal over a length of the at least two conductors; and shifting the phase of the sampled signal by the determined phase shift.

Optionally, the length comprises the length of said conductors between an input generator and said crossing.

Optionally, the determined phase shift is the phase shift at a central point along the length of the at least two conductors.

Optionally, the shifting is operative to provide maximum compensation of phase shift in a central area of the digitizer sensor and half the overall phase shift across the length of the at least two conductors at their endpoints.

Optionally, the digitizer sensor is a grid based digitizer sensor and wherein the at least two conductors are conductive lines associated with a first axis of the grid based sensor and the at least one other conductor is a conductive line associated with a second axis of the grid based sensor orthogonal to the first axis.

Optionally, the user interaction is detected by comparing an amplitude level of one of the orthogonal signal components and a signal level in the absence of the user interaction.

Optionally, the user interaction is selected from a group including fingertip, hand and conductive object.

Optionally, the user interaction is selected from a group including touch user interaction and hover user interaction.

Optionally, the signal transmitted to the at least two conductors is pulsed signal.

Optionally, the signal transmitted to the at least two conductors is an AC signal.

An aspect of some embodiments of the present inventions is the provision of a digitizer system comprising: a digitizer sensor comprising a first set of conductors and a second set of conductors that cross with the first set of conductors at cross junctions; a signal generator configured for providing first and second triggering signals at a pre-defined frequency to two conductors from the first set of conductors, wherein the first and second signals are orthogonal signals; a controller configured for sampling an output signal from at least one conductor from the second set of conductors; and a processor configured for decomposing the output signal sampled from the at least one conductor from the second set of conductors into orthogonal components and for detecting user interactions on the cross junctions of the of the digitizer sensor based on the orthogonal components of the sampled output signal.

Optionally, the output signal on the at least one conductor from second set of conductor is evoked from capacitive coupling at the cross junctions.

Optionally, the processor is configured for detection a position of the user interaction on the digitizer sensor.

Optionally, the first and second signals are orthogonal in phase.

Optionally, the processor includes orthogonal phase detectors.

Optionally, the processor includes a phase shift corrector configured for correcting phase of the output signal by a pre-determined phase shift of the triggering signal along a length of the at least two conductors.

Optionally, the digitizer sensor is a grid based digitizer sensor and wherein the first set of conductors are conductive lines associated with a first axis of the grid based sensor and the second set of conductors are conductive lines associated with a second axis of the grid based sensor orthogonal to the first axis.

Optionally, the user interaction is detected by comparing an amplitude level of one of the orthogonal signal components and a signal level in the absence of user interaction.

Optionally, the user interaction is selected from a group including fingertip, hand and conductive object.

Optionally, the user interaction is selected from a group including touch user interaction and hover user interaction.

Optionally, the signal transmitted to the two conductors is pulsed signal.

Optionally, the signal transmitted to the two conductors is an AC signal.

An aspect of some embodiments of the present inventions is the provision of a method for user interaction detection on a digitizer, the method comprising: simultaneously transmitting orthogonal signals having the same frequency on at least two conductors of a digitizer sensor; sampling a signal on at least one other conductor crossing the at least two conductors, wherein the signal is responsive to capacitive coupling at cross-junctions formed between the at least two conductors and at least one other conductor; determine multiple user interaction positions on the digitizer sensor from the sampled signal.

Optionally, the orthogonal signals are orthogonal in phase.

Optionally, the method comprises decomposing the sampled signal into orthogonal components; and analyzing the orthogonal components to determine the multiple user interaction positions.

Optionally, the user interaction is selected from a group including fingertip, hand and conductive object.

Optionally, the user interaction is selected from a group including touch user interaction and hover user interaction.

Optionally, the digitizer sensor is a grid based digitizer sensor and wherein the at least two conductors are conductive lines associated with a first axis of the grid based sensor and the at least one other conductor is a conductive line associated with a second axis of the grid based sensor orthogonal to the first axis.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
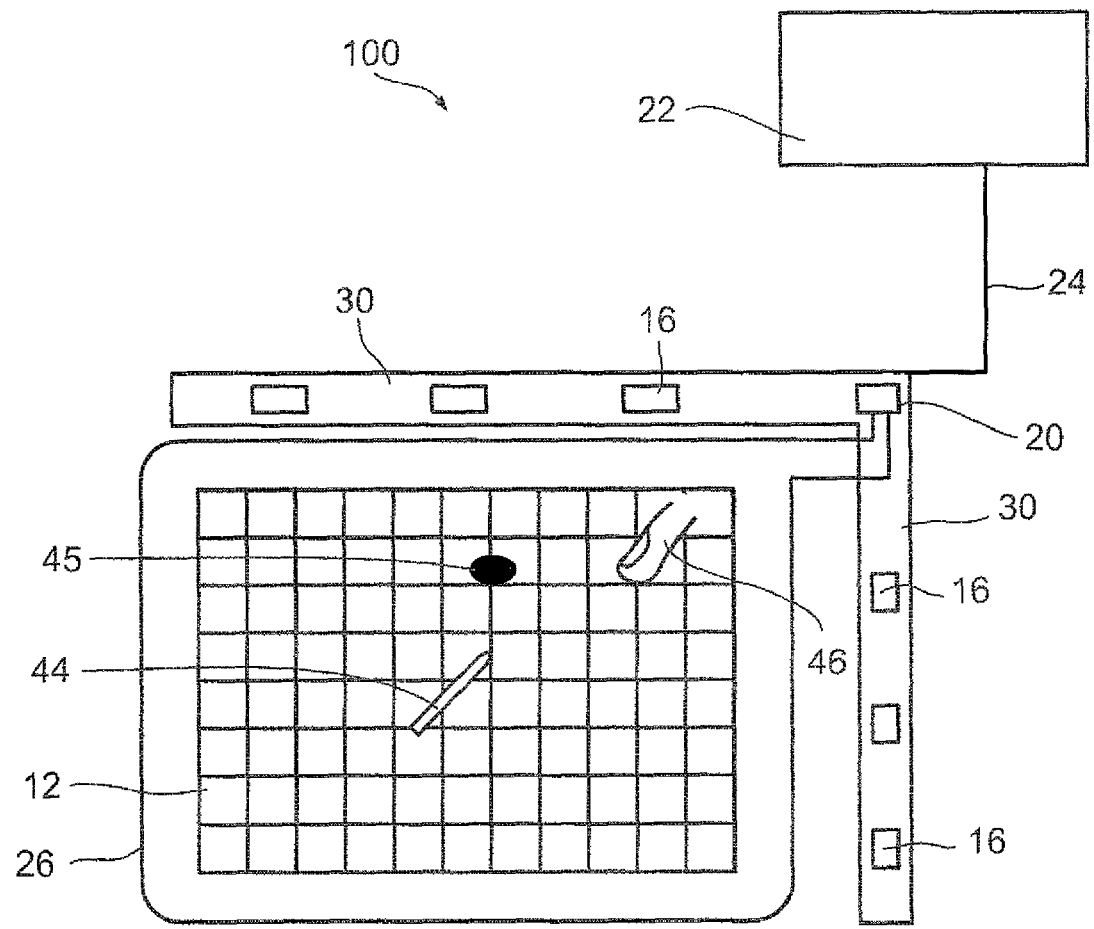
FIG. 1 is an exemplary simplified block diagram of a prior art digitizer and/or touchscreen system of the prior art that can be used with some embodiments of the present invention.

The present invention relates to digitizer systems, and, more particularly, but not exclusively, to interrogation of digitizer sensor lines for capacitive detection, e.g. finger detection and capacitive object detection.

An aspect of some embodiments of the present invention is the provision of methods for simultaneously interrogating and/or triggering a least two conductors, e.g. conductive lines of a digitizer sensor with signals having the same frequency. According to some embodiments of the present invention, the signals are substantially orthogonal in phase, e.g. have a phase difference of 90 degrees or close to 90 degrees. In some embodiments, the digitizer sensor includes a set of driving and/or active conductors and a set of passive (receiver) conductors. According to some embodiments of the present invention, pairs of active conductors are simultaneously interrogated with AC signals having substantially orthogonal phases. In some exemplary embodiments, the AC signals are pulse modulated signals. In response to each AC signal applied, a signal is transferred, by capacitive coupling, to each of the passive conductors. As a result at least two signals having a same frequency but orthogonal phase are coupled to each of the passive conductors so that each passive conductor carries a resultant signal including two signal components orthogonal in phase. The presence of a finger or an object typically alters the signal transferred to the passive conductors in the vicinity of the finger or object. Signals detected on the passive conductors, e.g. the resultant signal, are decomposed into orthogonal phase components and interaction locations of fingertips and/or objects are determined in response to an amplitude level of each of the decomposed signals. According to some embodiments of the present invention, orthogonal phase detectors are operative to decompose the signals. Typically, the amplitude level is compared to a baseline signal and/or level. As used herein the term baseline signal and/or base level refers to an amplitude level of a signal determined when no user interaction is present.

The present inventors have found, quite surprisingly that user interaction, e.g. fingertip, hand, capacitive object (such as a token), on grid based digitizer sensors do not significantly alter the phase of resultant signals evoked on the passive lines. Since resultant signals substantially maintain an orthogonal relationship between their signal components in the presence of user interaction, they can be readily decomposed into their original components to allow detection. Ignoring small changes in phase in response to interaction and assuming that the signal components maintain their orthogonal relationship was found not to significantly impact the detection capability of the digitizer.

The present inventors have also found that although there isn't a significant phase shift due to capacitive coupling in response to a user interaction, there is a gradual and predictable phase shift or phase rotation of signals along the length of the active lines from which the interrogation signal was introduced. This phase shift is typically due to the capacitive property of the sensor. The present inventors have found that depending on the size of the digitizing surface and the sensitivity required, this phase shift picked up and/or detected on respective passive lines can either be ignored or corrected. In some exemplary embodiments, a phase shift correction is introduced. In some exemplary embodiments, a global phase shift correction is applied to correct for phase shift obtained midway along the length of the active conductor so that the greatest accuracy is obtained in the center area of the digitizer and errors due to phase are ±½ maximum phase shift at both ends. In some exemplary embodiments, a different phase correction is applied to different sections of the sensor and/or to each line that crosses the active conductor, e.g. each passive line.

According to some embodiments of the present invention, orthogonal phase signals are applied to system and methods described in incorporated US Patent Application Publication No. 20070062852 in order to increase the interrogation rate of a digitizer sensor. According to some embodiments of the present invention, simultaneous detection is enhanced, e.g. doubled, by using signals having orthogonal phase for each frequency.

According to some embodiments of the present invention, phase sensitive detectors are used to decompose the resultant signals into their orthogonal components, e.g. real and imaginary components. According to some embodiments of the present invention, each orthogonal component is determined with a single detector, e.g. sine and cosine correlator. Since the presence of a finger doesn't alter the phase of the interrogation signal, the phase is known and only the amplitude of the real and imaginary components is required for detection of user interaction. The ability to decompose the signal with simple phase sensitive detectors provides for a cost-efficient method (with respect to computing power and size of memory) for providing simultaneous interrogation of conductors of a digitizer sensor.

According to some embodiments of the present invention, for systems simultaneously interrogating lines with orthogonal frequencies and orthogonal phase shift, the resultant signal is decomposed into different components including each orthogonal frequency and each orthogonal phase.

According to some embodiments of the present invention, other orthogonal modulations besides and/or in addition to phase modulation are applied to provide simultaneous interrogation of a plurality of lines and/or of a plurality of interrogation signals having the same frequency. In some exemplary embodiments, amplitude modulation is applied and a demodulator operating at the carrier frequency can be is used to demodulate the signal.

Referring now to the drawings, FIG. 1 shows an exemplary simplified block diagram of a prior art digitizer system that can be used with some embodiments of the present invention. The digitizer system 100 may be suitable for any computing device that enables touch input between a user and the device, e.g. mobile and/or desktop and/or tabletop computing devices that include, for example, FPD screens. Examples of such devices include Tablet PCs, pen enabled lap-top computers, tabletop computer, PDAs or any hand held devices such as palm pilots and mobile phones or other devices that facilitate electronic gaming. The digitizer system comprises a sensor 12 including a patterned arrangement of conductive lines, which is optionally substantially transparent, and which is typically overlaid on a FPD. Typically sensor 12 is a grid based sensor including horizontal and vertical conductive lines.

Sensor 12 comprises conductive lines made of conductive materials, optionally Indium Tin Oxide (ITO), patterned on a foil or glass substrate. The conductive lines and the foil are optionally transparent or are thin enough so that they do not substantially interfere with viewing an electronic display behind the lines. Typically, the grid is made of two layers, which are electrically insulated from each other. Typically, one of the layers contains a first set of equally spaced parallel conductive lines and the other layer contains a second set of equally spaced parallel conductive lines orthogonal to the first set. Typically, the parallel conductive lines are input to amplifiers. Optionally the amplifiers are differential amplifiers.

Typically, the parallel conductive lines are spaced at a distance of approximately 2-8 mm, e.g. 4 mm, depending on the size of the FPD and a desired resolution. Optionally the region between the grid lines is filled with a non-conducting material having optical characteristics similar to that of the (transparent) conductive lines, to mask the presence of the conductive lines. Optionally, the ends of the lines remote from the electronic circuit, e.g. amplifiers, are not connected so that the lines do not form loops.

Circuitry is optionally provided on one or more PCB(s) 30 positioned around sensor 12. According to some embodiments of the present invention, one or more ASICs 16 positioned on PCB(s) 30 comprises circuitry to sample and process the sensor's output into a digital representation. The digital output signal is forwarded to a digital unit 20, e.g. digital ASIC unit also positioned on PCB 30, for further digital processing. According to some embodiments of the present invention, digital unit 20 together with ASIC 16 serves as the controller of the digitizer system and/or has functionality of a controller and/or processor. Typically, digital unit 20 together with ASIC 16 includes memory and/or memory capability. Memory capability may include volatile and/or non-volatile memory, e.g. FLASH memory. Output from the digitizer sensor is forwarded to a host 22 via an interface 24 for processing by the operating system or any current application.

Typically, ASIC 16 is connected to outputs of the various conductive lines in the grid and functions to process the received signals at a first processing stage. ASIC 16 typically includes an array of amplifiers to amplify the sensor's signals. Additionally, ASIC 16 optionally includes one or more filters to remove frequencies that do not correspond to frequency ranges used for excitation and/or obtained from objects used for user touches. Optionally, filtering is performed prior to sampling. The signal is then sampled by an A/D, optionally filtered by a digital filter and forwarded to digital ASIC unit 20, for further digital processing. Alternatively, the optional filtering is fully digital or fully analog. Further details on the operation of this system can be found in incorporated publications U.S. Pat. No. 7,372,455 and US20070062852.

Digital unit 20 receives the sampled data from ASIC 16, reads the sampled data, processes it and determines and/or tracks the position of fingertip 46 and physical objects such as a token 45, a stylus 44, and/or an electronic tag touching the digitizer sensor from the received and processed signals. According to some embodiments of the present invention, digital unit 20 determines the presence and/or absence of physical objects, such as stylus 44, and/or finger 46 over time. According to some embodiments of the present invention, both touch user interaction and hover user interaction is detected. For example hovering of an object, e.g. stylus 44, finger 46 and hand, is also detected and processed by digital unit 20. Calculated position and/or tracking information are sent to the host computer via interface 24. Memory and processing functionality may be divided between any of host 22, digital unit 20, and/or ASIC 16.

Typically, an electronic display associated with the host computer displays images. Optionally, the images are displayed on a display screen situated below a surface on which the finger and/or object is placed and below the sensors that sense the physical objects or fingers.

Stylus Detection and Tracking

Optionally, digital unit 20 produces and controls the timing and sending of a triggering pulse to be provided to an excitation coil 26 that surrounds the sensor arrangement and the display screen. The excitation coil provides a trigger pulse in the form of an electric or electromagnetic field that excites passive circuitry in stylus 44 or other physical object used for user touch to produce a response from the stylus that can subsequently be detected. Optionally, stylus detection and tracking is not included and the digitizer sensor only functions as a capacitive sensor to detect the presence of fingertips, body parts and conductive objects, e.g. tokens.

Fingertip Detection and Tracking

Digital unit 20 produces and sends an interrogation signal such as a triggering pulse to at least one of the conductive lines. Typically the interrogation pulses and/or signals are pulse modulated sinusoidal signals. The interrogation pulse and/or signal implemented may be confined to one or more pre-defined frequencies, e.g. 18 KHz or 20-40 KHz. Finger touch detection is facilitated when sending an interrogation pulse to the conductive lines.

Figure 2:
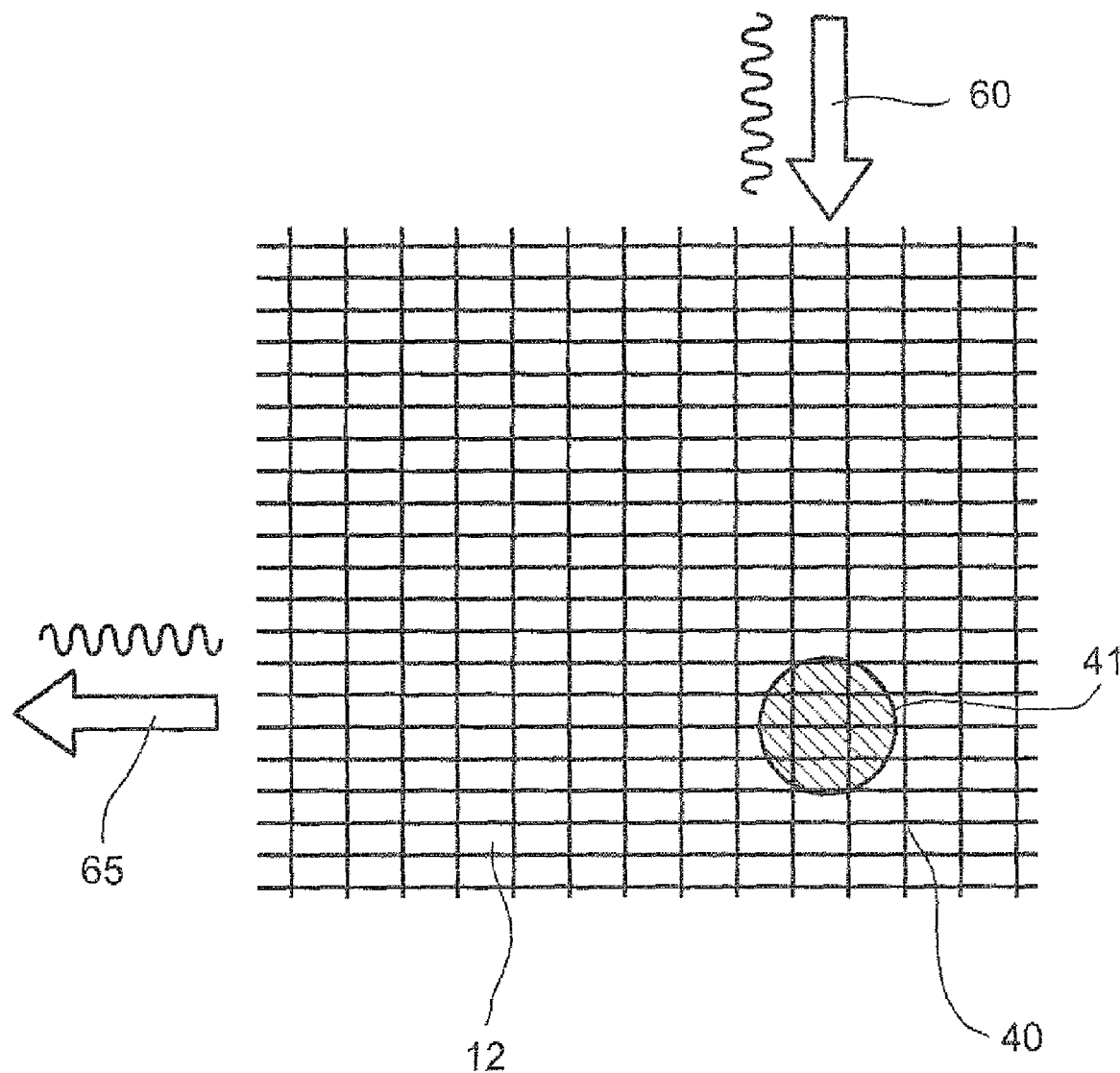
FIG. 2 is a schematic illustration of fingertip touch detection based on a prior art capacitive touch method for detecting fingertip touch that can be used with some embodiments of the present invention.

Reference is now made to FIG. 2 showing a schematic illustration of fingertip and/or token touch detection based on a prior art capacitive touch method for detecting fingertip touch that can be used with some embodiments of the present invention. At each junction, e.g. junction 40 in sensor 12 a certain capacitance exists between orthogonal conductive lines. In an exemplary embodiment, an AC signal 60 is applied to one or more parallel conductive lines in the two-dimensional sensor matrix 12. When a finger touches the sensor at a certain position 41 where signal 60 is induced on a line, e.g. active and/or driving line, the capacitance between the conductive line through which signal 60 is applied and the corresponding orthogonal conductive lines, e.g. the passive lines, at least proximal to the touch position changes and signal 60 crosses by virtue of the capacitance of finger 46 to corresponding orthogonal conductive lines to producing a lower amplitude signal 65, e.g. lower in reference to a baseline amplitude. This method is able to detect more than one finger touch and/or capacitive object (token) at the same time (multi-touch). Typically, an interrogation signal is transmitted to each of the driving lines in a sequential manner. Output is simultaneously sampled from each of the passive lines in response to each transmission of a interrogation signal to a driving line. This method further enables calculating touch area. In exemplary embodiments of the present invention, each conductive line is input to an amplifier and output is sampled from the output of the amplifier. Optionally, each line is input to a differential amplifier, while the other input to the amplifier is ground. Typically, the presence of a finger decreases the amplitude of the coupled signal by 15-20% or 15-30% since the finger typically drains current from the lines to ground.

Token Detection and Tracking

In some known systems, the apparatus is further capable of detecting and tracking a position of one or more physical objects 45 including one or more small conductive elements placed on a surface object in contact with the digitizer surface, e.g. tokens. Detection of tokens may be performed in a similar manner to fingertip detection. An AC signal 60 is applied to one or more parallel conductive lines in the two-dimensional sensor matrix 12 and output is sampled on the orthogonal lines to detect a coupled signal. Typically in response to a token positioned over and/or near a junction between two orthogonal conductive lines, a coupled signal at the junction is increased by about 5-10%, apparently by increasing the capacitive coupling between active and passive conductive line.

Figure 3:
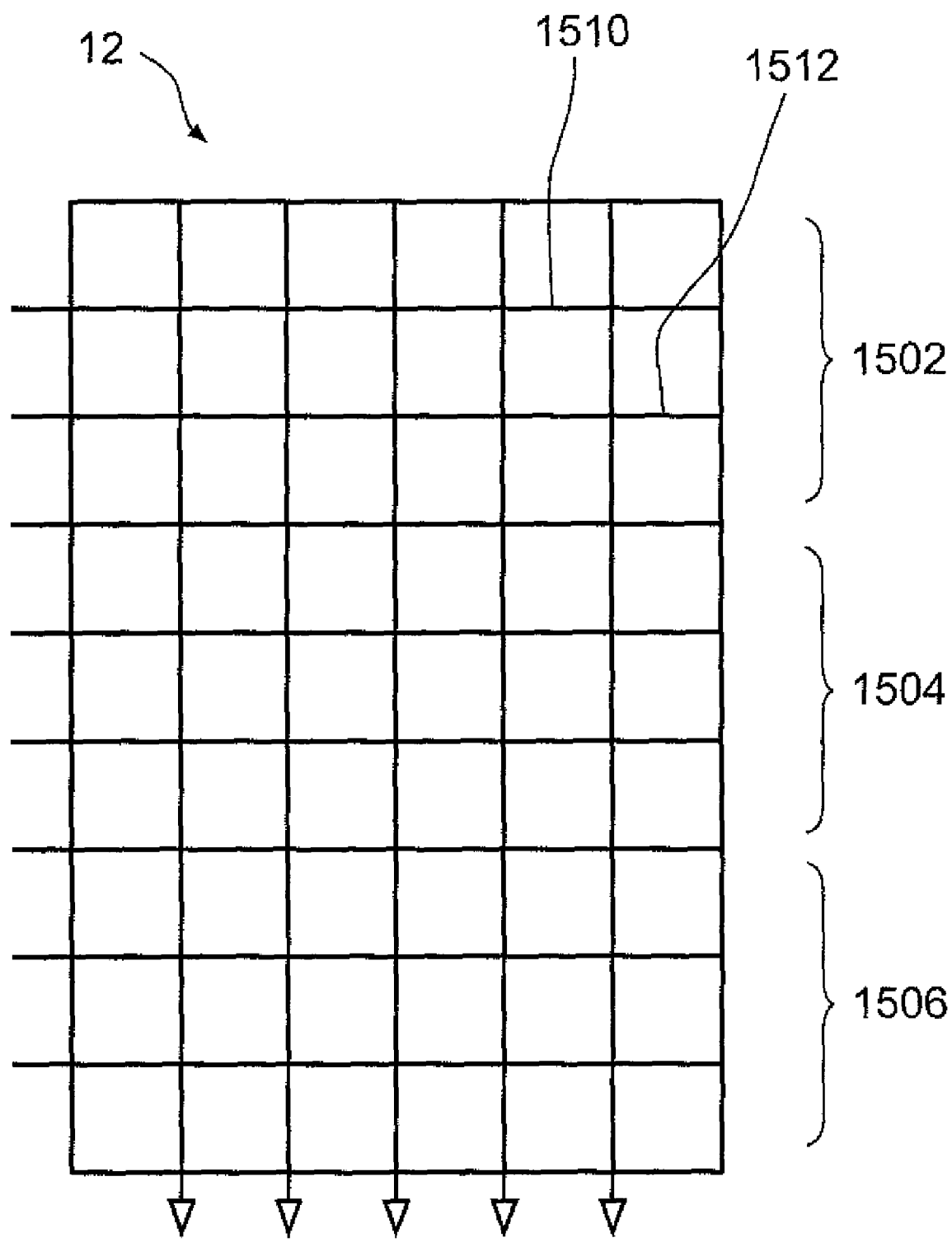
FIG. 3 is a schematic illustration of a prior art sequentially activated sensor array that can be used with some embodiment of the invention.

Reference is now made to FIG. 3 showing a schematic illustration of a prior art sequentially activated sensor array that can be used with some embodiment of the invention. In order to speed up report rate, horizontal active conductive lines are divided into a number of groups 1502, 1504, 1506 wherein the active lines (such as 1510, 1512) in each group are activated sequentially but the groups work simultaneously. This is accomplished by using a handful of non-mutually interfering (orthogonal) frequencies which are used to activate the active lines. For example, at a sampling rate of 200 kHz, exemplary frequencies of 20 kHz, 30 kHz, and 40 kHz are used. These handfuls of frequencies are assigned one to each group. It should be understood, however, that these frequencies change depending on the sampling rate and sampling window, and that they are not limited to 3 frequencies, as 20 kHz, 30 kHz and 40 kHz are by way of example only. The orthogonal frequencies are orthogonal in the sense that one frequency doesn't significantly influence the other frequency.

Typically, the number of orthogonal frequencies that can be used for interrogation is limited for a given bandwidth of activating frequencies and therefore the report rate that can be achieved in this manner is also limited. In addition to the limitation of the bandwidth, within the given bandwidth, a number of the available orthogonal frequencies may be difficult to work with due to environmental influences.

According to some embodiments of the present invention, ASIC 16 includes phase sensitive detectors for decomposing received signal into their orthogonal components. The phase reference for this decomposition is correlated with interrogating signals as described below. In some exemplary embodiments, decomposition of the received signals is performed by Digital unit 20.

The present inventors have found that the phase of the coupled signal is not altered and/or not significantly altered in response to fingertip touch. In some known systems, amplitude of the signal within a bandwidth of 18-40 KHz is examined to detect fingertip touch.

Typically, the phase of the coupled signal is not altered and/or not significantly altered in response to presence of a token. Preferably, the object comprises a geometric arrangement of tokens that is used to identify the physical object.

According to some embodiments of the present invention, the report and/or interrogation rate can be further increased by interrogating different conductors of a digitizer with signals having the same frequency but that are orthogonal in phase.

Reference is now made to FIGS. 4A-4D showing four different scenarios of signal outputs on a receiving line in response to simultaneous activating two lines with signals that are orthogonal in phase in accordance with some embodiments of the present invention. According to some embodiments of the present invention, orthogonal pulsed signals 415 and 425 are simultaneously transmitted over active lines 401 and 402 respectively. According to some embodiments of the present invention, signals 415 and 425 are sinusoidal and can be represented as real A1 and imaginary A2 vectors on a complex plane respectively. According to some embodiments of the present invention, in response to interrogation of lines 401 and 402, signals are evoked on receiving lines, e.g. receiving line 400 are detected.

According to some embodiments of the present invention output from receiving line 400 including signals evoked from active lines 401 and 402 are decomposed to orthogonal components 515 and 525 respectively, e.g. real and imaginary components, e.g. phasors B1 and B2, on a complex plane. According to some embodiments of the present invention, output from receiving line 400 can be represented by a phasor B12 having both real component B1 and imaginary component B2. According to some embodiments of the present invention, a phasor projected on the real axis represents output from junction 420 associated with line 402. Likewise in accordance with some embodiments of the present invention, a phasor projected on the imaginary axis represents output from junction 420 associated with line 402. Typically, the amplitude of components 515 and 525 is lower than those of interrogation signals 415 and 425.

Figure 4A:
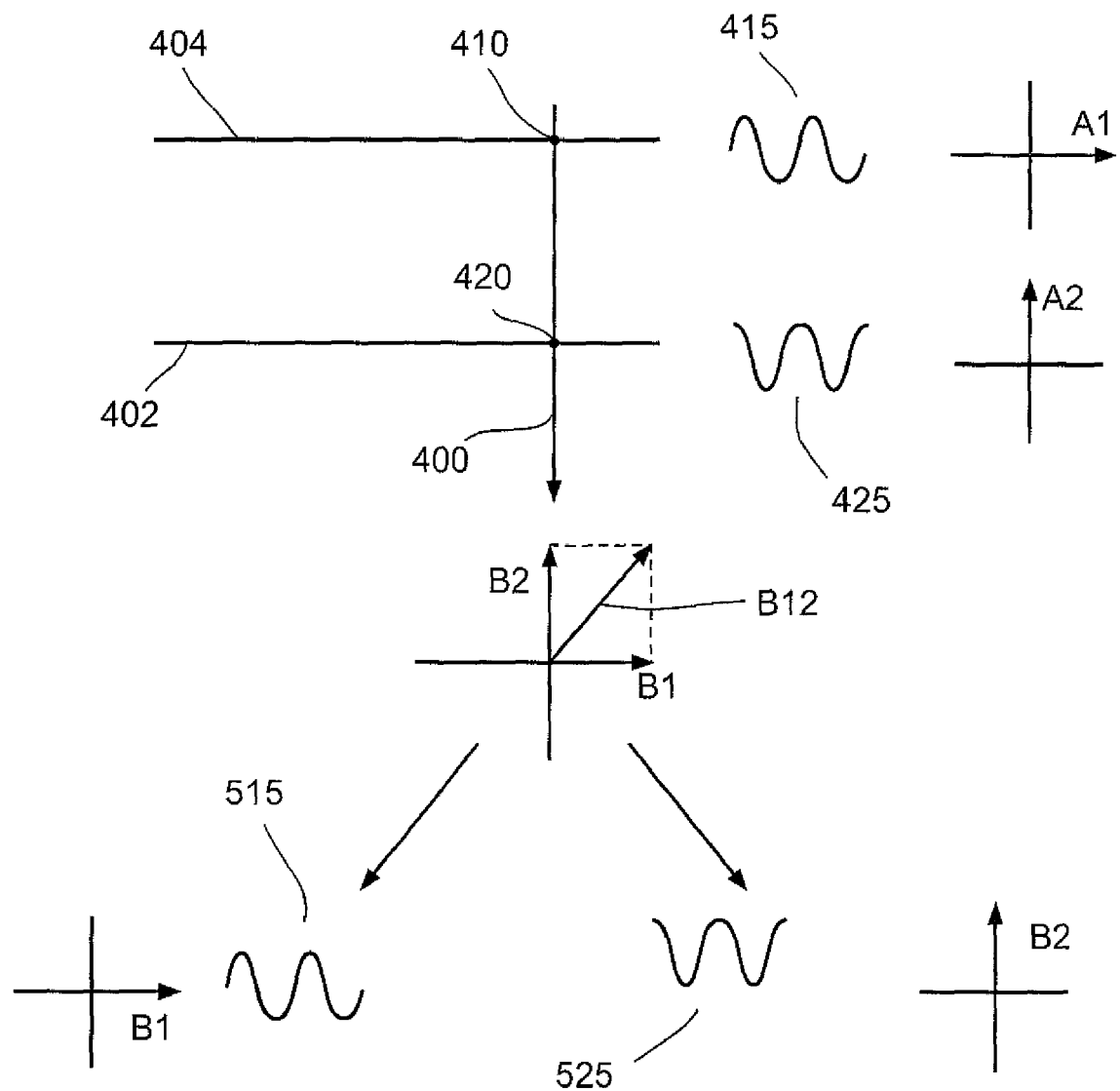
FIGS. 4A-4D showing four different scenarios of signal outputs on a receiving line in response to simultaneous interrogation of two active lines with signals orthogonal in phase in accordance with some embodiments of the present invention.
Figure 4B:
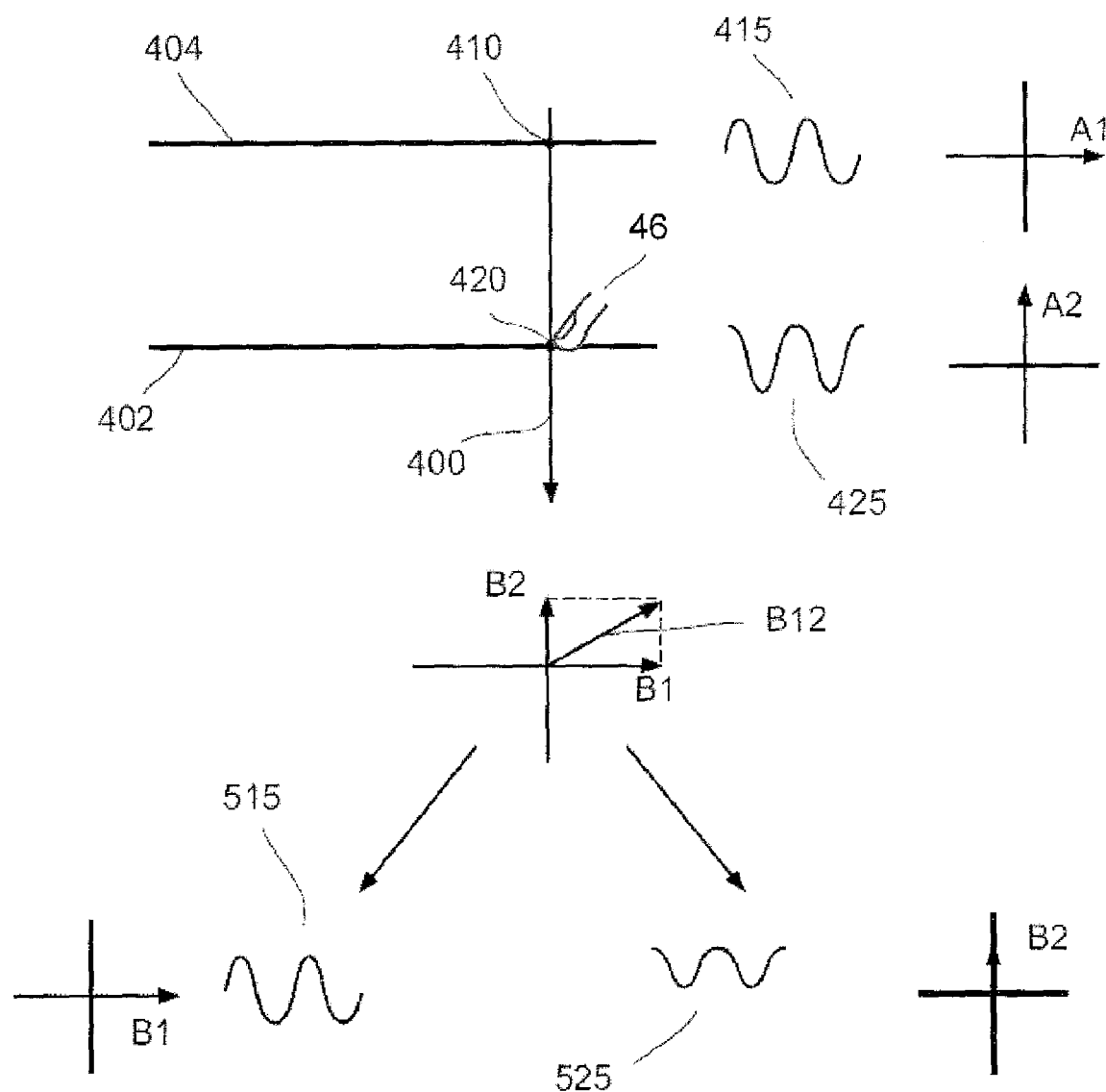
Figure 4C:
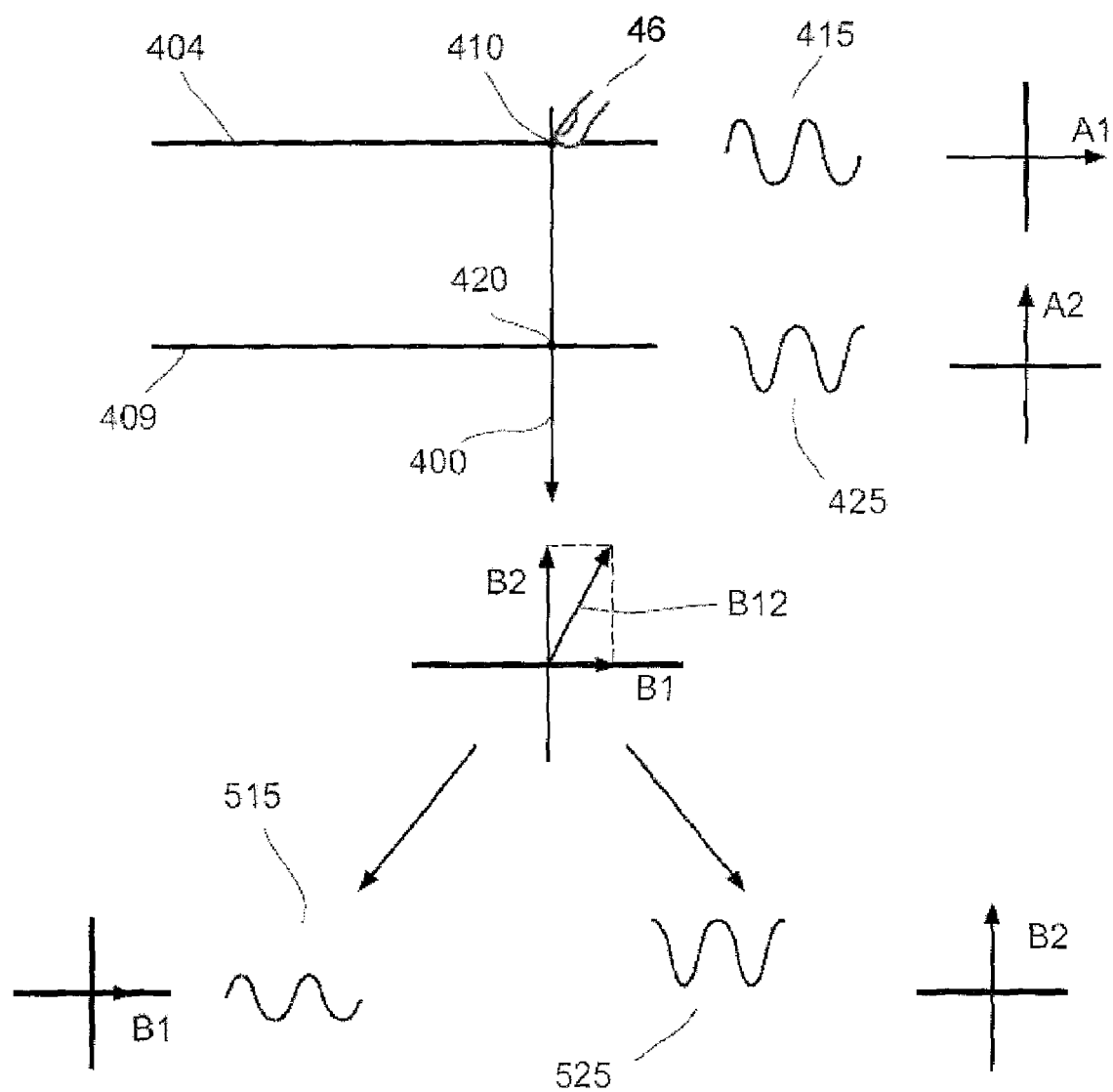
Figure 4D:
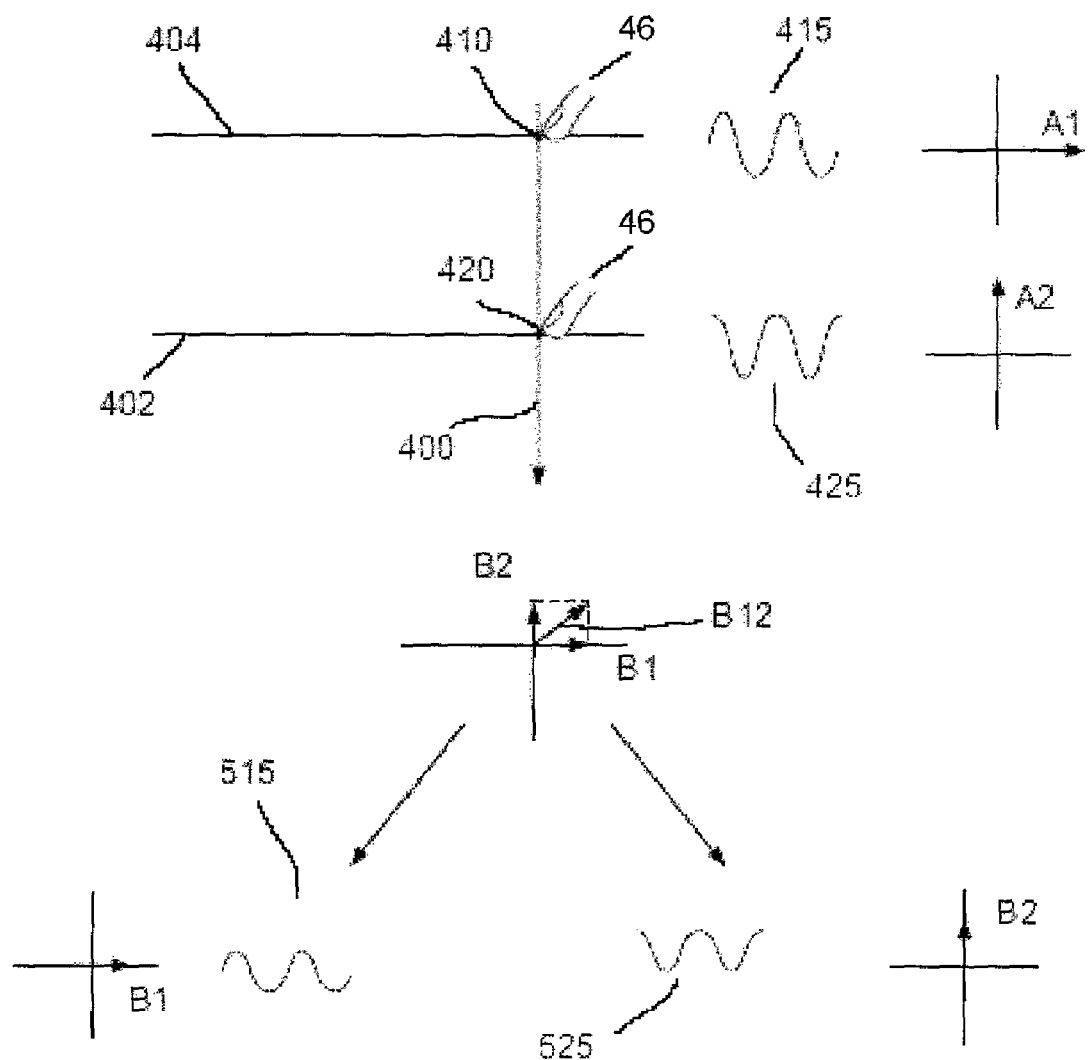

According to some embodiments of the present invention, detection of user interaction at junctions 410 and 420 is based on amplitude analysis of decomposed signals 515 and 520 and/or vectors B1 and B2. Typically, amplitude level for detection is compared to a baseline amplitude of components 515 and 525, e.g. amplitude in the absence of user interaction interacting with the digitizer sensor. In FIG. 4B, the presence of fingertip 46 on junction 420 serves to reduce the amplitude of signal 525 such that the projection of vector B12 on the imaginary axis is shorter than baseline projection of signal B2 and amplitude level of signal 525 is smaller than baseline amplitude of 525. In contrast, the amplitude of signal 515 at junction 410 where there is no user interaction present is approximately the same as the baseline level determined. According to some embodiments of the present invention, in response to a decrease in amplitude (in comparison to amplitude of a baseline signal) above a pre-defined threshold, e.g. 15-20% decrease, a fingertip interaction is detected. In FIG. 4C, user interaction at junction 410 serves to reduce amplitude of interrogation signal 415 to signal 515 and in FIG. 4D, both user interaction at both junctions 410 and 420 are detected by a reduction in amplitude of both signal 415 and 425 to obtain signals 515 and 525 respectively.

The present inventors have found that user interaction does not significantly affect phase of signals coupled from interrogation signals 415 and 425 so that signal output 515 is in phase with interrogation signal 415 and signal output 525 is in phase with interrogation signal 425. Although there may be a slight shift in phase, e.g. 3-4 degree shift, in the presence of a user interaction, the present inventors have found that such a shift does not significantly affect detection since most if not all of the signal is projected on the correct axis, e.g. either real or imaginary, when decomposing the signals. A shift of approximately 3-4 degrees corresponds to a change in detected amplitude of about 1%

Although FIG. 4 has been described in reference to fingertip detection, a similar method for object detection, e.g. token detection is applied. According to some embodiments of the present invention, the presence of a token serves to increase the amplitude as opposed to fingertip presence that tends to decrease the amplitude.

Figure 5:
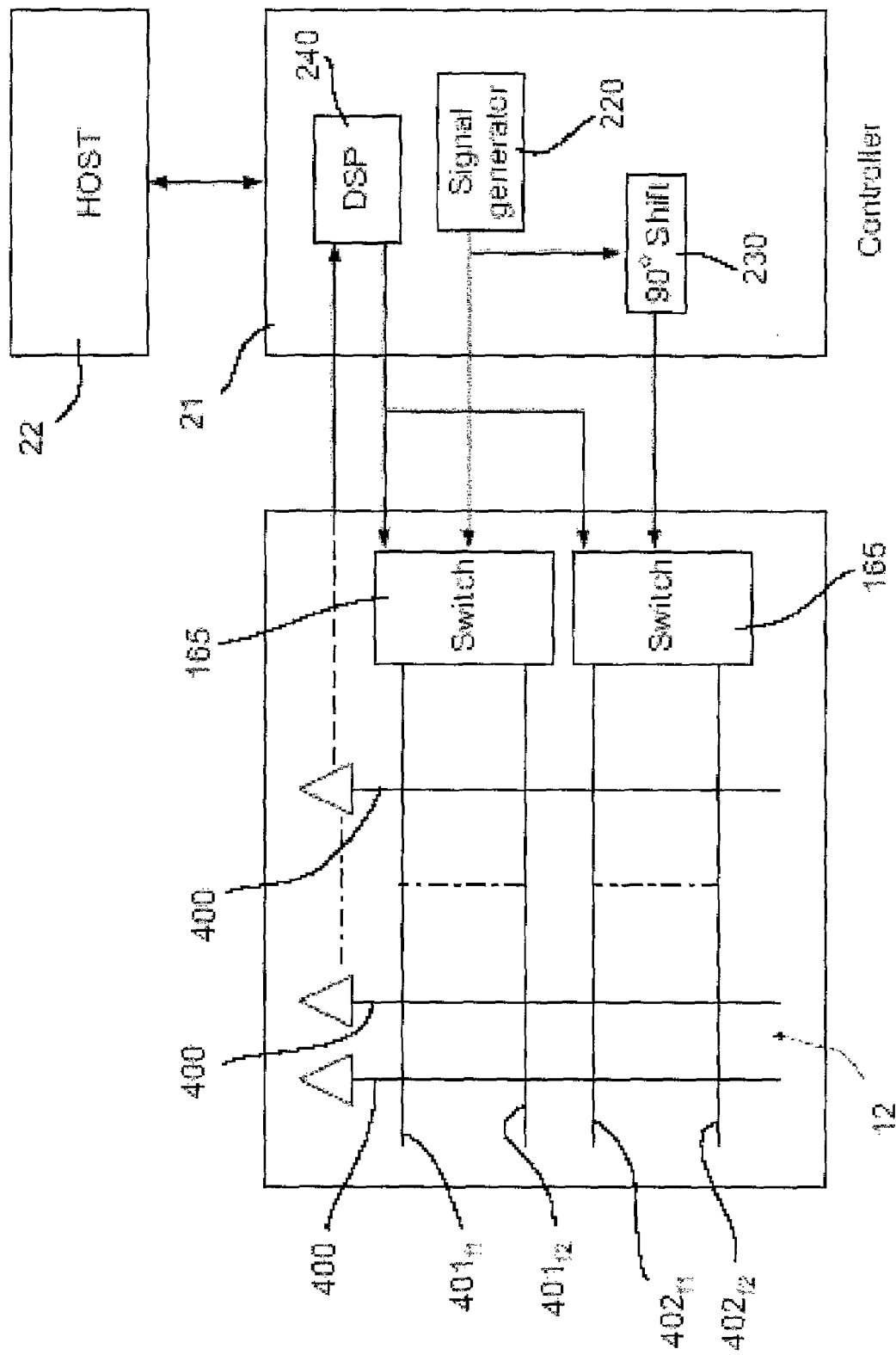
FIG. 5 is an exemplary simplified block diagram of circuitry associated with a digitizer sensor used to simultaneously interrogate pairs of lines with orthogonal phase in accordance with some embodiments of the present invention.

Reference is now made to FIG. 5 showing an exemplary simplified block diagram of circuitry associated with a digitizer sensor used to simultaneously interrogate pairs of lines with orthogonal phase in accordance with some embodiments of the present invention. According to some embodiments of the present invention, where a handful of non-mutually interfering orthogonal frequencies are used to activate electrodes as described in reference to incorporated publication US2007006852, the orthogonal phase shifting described herein can be applied to each frequency group. According to some embodiments of the present invention, each frequency group is divided into two sub-groups having orthogonal phases. According to some embodiments of the present invention, digital ASIC 20 includes a controller 21 for controlling interrogation of exemplary active lines 401$_{f1}$, 402$_{f1}$, 401$_{f2}$, and 402$_{f2}$. According to some exemplary embodiments of the present invention, signal generator 220 generates two orthogonal frequencies F1 and F2 transmitted to the active lines via switch 165. According to some embodiments of the present invention, the signals generated by signal generator 220 are defined by Digital Signal Processor (DSP) 240 included in controller 21. According to some embodiments of the present invention, a phase shift unit 230 generates orthogonal phase signals on the active lines 401$_{f1}$ and 402$_{f1}$ that are orthogonal in phase and have a common frequency F1, and lines 401$_{f2}$ and 402$_{f2}$ that are orthogonal in phase and have a common frequency F2. The phase shift unit can be an analog unit or a digital unit. In some exemplary embodiments, the phase shift is driven by software, e.g. software embedded in firmware. According to some embodiments of the present invention, output from passive lines 400 are sampled and processed by DSP 240. According to some embodiments of the present invention, output detected from passive lines 400 is responsive to four different signals that are decomposed into their frequency (F1 and F2) and phase components (401 and 402) to allow detection of user interaction at four grid points of digitizer sensor 12. Detection and tracking information is typically forwarded to host 22. According to some embodiments of the present invention, the orthogonal phase shifting can be implemented in hardware as well as in software. Although, FIG. 5 has been described using two orthogonal frequencies, more than two orthogonal frequencies may be applied. The method is also applicable to interrogation with a single frequency.

Applying phase shifted signals at a same frequency allows for either reducing the number of frequencies required or increasing the number of conductors in a simultaneously excited group of conductors. In either case, the time between interrogations of each line is halved.

Figure 6:
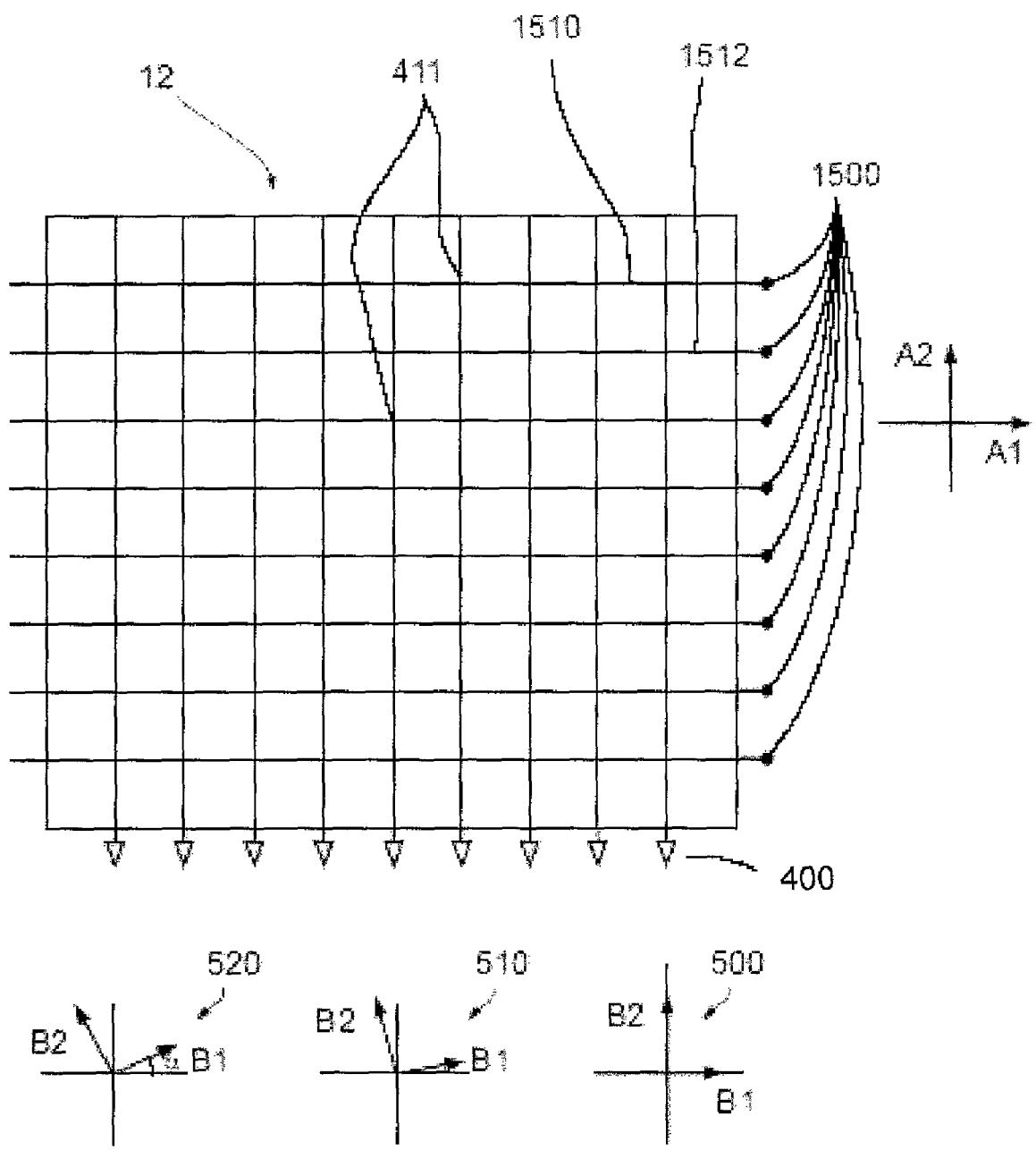
FIG. 6 is a schematic illustration of predictable phase shift across a digitizer sensor in accordance to some embodiments of the present invention.

Reference is now made to FIG. 6 showing a schematic illustration of predictable phase shift across a digitizer sensor due to the capacitive properties of the digitizer sensor in accordance to some embodiments of the present invention. The present inventors have found that there is a predictable phase shift along active lines, e.g. lines 1510 and 1512, that increases as a function of distance from the points 1500 and/or input generator positioned at points 1500 from which a trigging signal is introduced. This phase shift is common to both orthogonal components of the signal and is independent from a phase shift that may occur due to capacitive coupling with a user interaction. Since the phase shift is common to both orthogonal components of the signal, the orthogonal property of the signal components is maintained.

According to some embodiments of the present invention, output from passive lines 400 proximal to interrogation points 1500 has a zero phasor rotation as shown by real and imaginary vectors 500. For passive lines distanced from interrogation points 1500 a gradually rotation of the phasor vectors occurs as shown by vectors 510 and 520. According to some embodiments of the present invention, for digitizer sensors adapted for a 12" screen, phasor rotation α typically reaches up to 30 degrees at a far end of the digitizer sensor with respect to interrogation points 1500.

In response to phasor rotation the projection of on each of the axis, e.g. real and imaginary is altered so that the projection may increase on one axis and decrease on the orthogonal axis. The present inventors have found that, if phasor rotation above a pre-defined angle is not accounted for, detection may be hampered. According to some embodiments of the present invention, a rotation above a defined threshold, e.g. 15 degrees is considered to significantly affect the amplitude level detected on each axis and therefore the ability to accurately identify user interaction. For example, a rotation of 15 degrees may introduce a 3% error in amplitude of output signal projected on the imaginary axis, e.g. cos(15)=0.97 and a 30 degrees may introduce a 13% error in amplitude of output signal projected on the imaginary axis, e.g. cos(30°)=0.87. Since fingertip interaction typically reduces the amplitude by 5-20%, detection of the fingertip may be masked for phase shifts greater than 15 degrees.

The present inventors have also found that although, the phase on the passive line is generally the same as the phase on the respective active lines, there is typically also a minor phasor rotation on the passive line that is detected in the output. This rotation is also due to the capacitive properties of the digitizer sensor and is a function of the distance between the junction from which a signal is transferred, by capacitive coupling to the passive line and the end of the passive line where the output is sampled. Since this distance is different for each of the orthogonal signals, the orthogonal relationship may be altered. The present inventors have found, that errors due to phasor rotation along the passive lines are minor and can be minimized by limiting the distance between active lines that are simultaneously interrogated.

Although the phase shift across the digitizer sensor has been shown to be in the counter-clock wise direction, the system and methods described herein can also be applied for a phase shift in the clock-wise direction.

Figure 7:
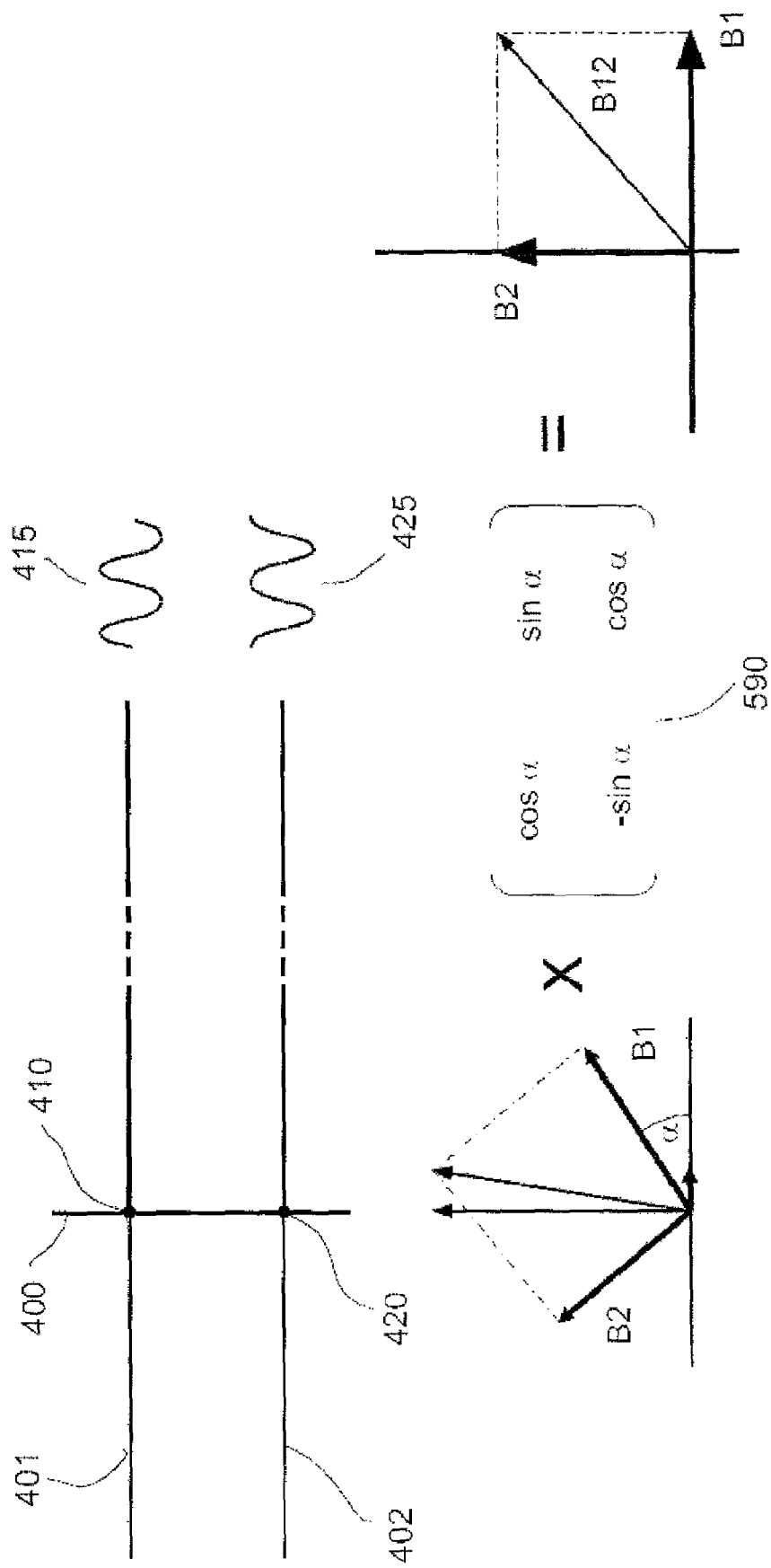
FIG. 7 is a schematic illustration of phase correction on a receiving line in response to a predicted shift in accordance with some embodiments of the present invention.

Reference is now made to FIG. 7 a schematic illustration of phase correction on a receiving line in response to a predicted phasor rotation in accordance with some embodiments of the present invention. According to some embodiments of the present invention, signals detected on the passive lines may be shifted against the predicted phasor rotation to correspond to 0 degrees and 90 degrees so that the detected signals can be properly decomposed. Optionally, the correlators results, e.g. real and image detectors, may be shifted and/or rotated to be aligned with predicted phase shift and/or phase rotation. According to some embodiments of the present invention, a rotation transformation 590 is performed on output from passive line 400 to correct for the phasor rotation α so that the output can be decomposed to its components B1 and B2. According to some embodiments of the present invention, phase correction is performed by DSP 240 (FIG. 5).

Figure 8:
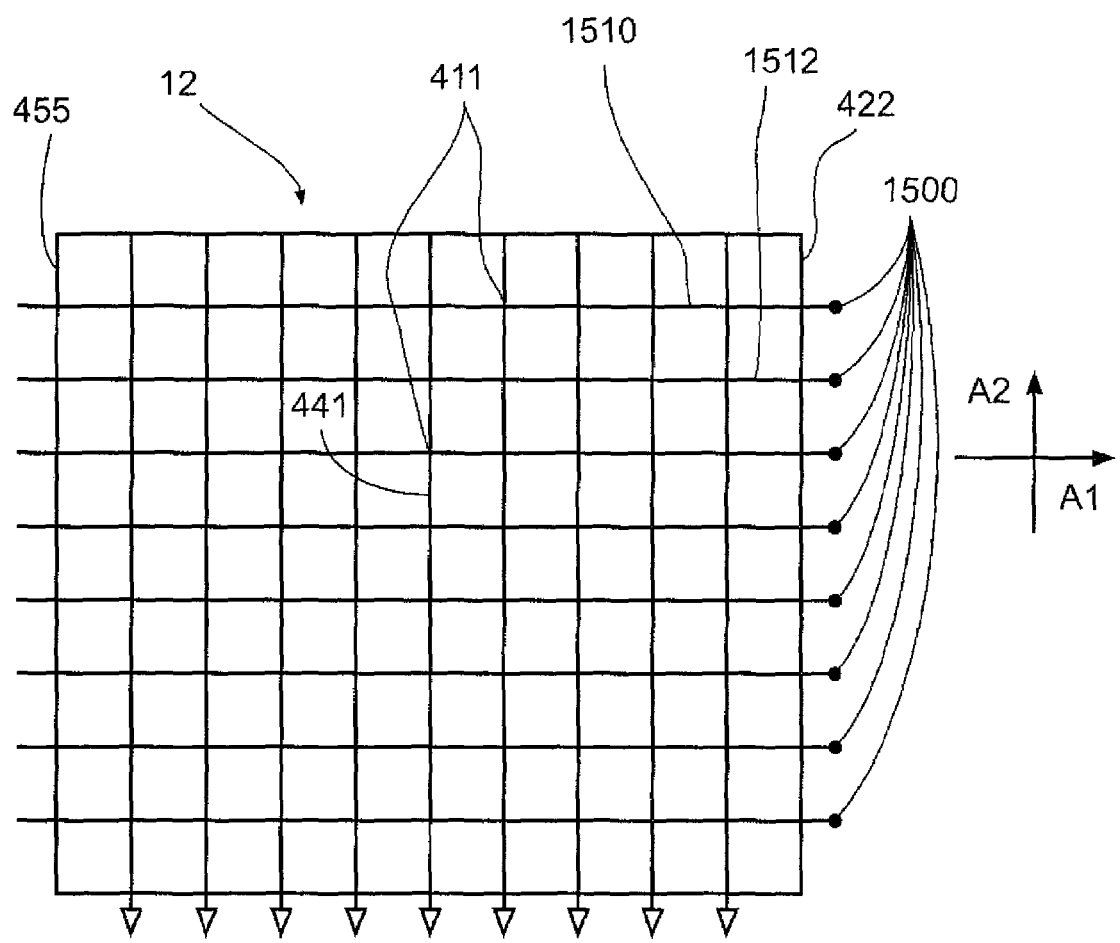
FIG. 8 is a schematic illustration of a global phase correction applied with respect to a centralized receiving line in accordance with some embodiments of the present invention.
Figure 8:
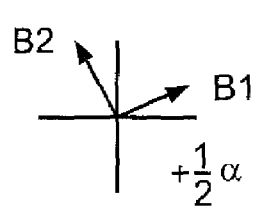
Figure 8:
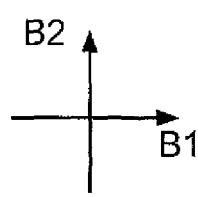
Figure 8:
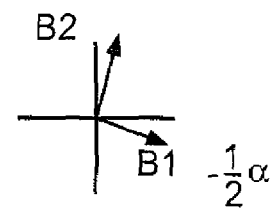

Reference is now made to FIG. 8 showing a schematic illustration of a global phase correction applied with respect to a centralized receiving line in accordance with some embodiments of the present invention. According to some embodiments of the present invention, a global correction is introduced to all passive lines to correct for the gradual phase shift across the digitizer sensor. According to some embodiments of the present invention, the global shift provides for zero phase shift in a center receiving line, e.g. receiving line 441 and for ±½α on opposite ends, e.g. receiving lines 455 and 422. In such a configuration, the transmitting signal arrives to the middle of the sensor in zero phase shift with respect to the real and imaginary correlators. This provides for obtaining maximum sensitivity in the central area of the digitizer and for reducing maximum rotation by one half. Optionally, phase shift correction may be customized for each receiving line and/or for groups of receiving lines. This may be particularly suitable for large form factor displays. According to some embodiments of the present invention, phase shift correction may be customized for each receiving line and/or for groups of receiving lines by defining dedicated correlators for each receiving line and/or group based on predicted phase shift along the active lines.

Figure 9:
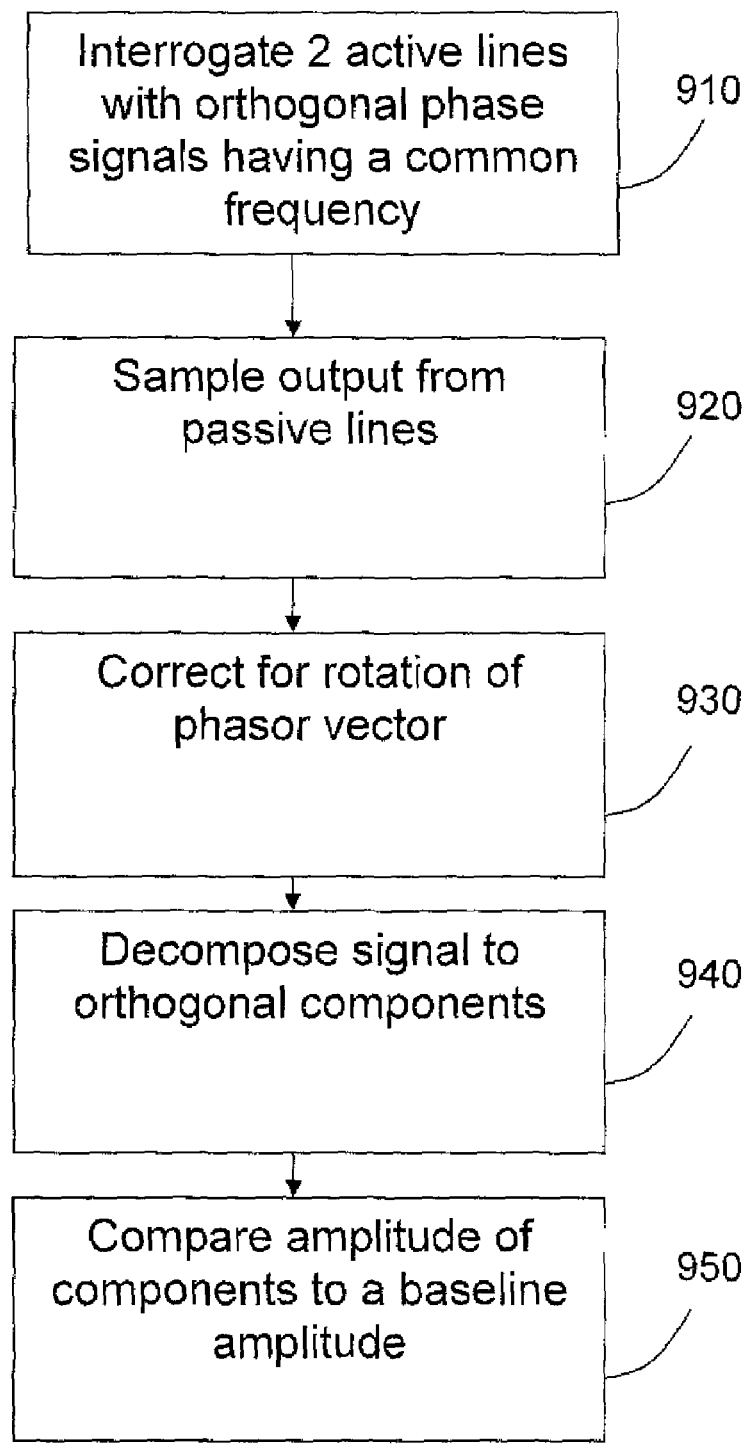
FIG. 9 is a simplified flow chart of an exemplary method for detecting user interaction in response to simultaneous interrogation of conductive lines of a digitizer sensor with signals orthogonal in phase in accordance with some embodiments of the present invention.

Reference is now made to FIG. 9 showing a simplified flow chart of an exemplary method for detecting user interaction in response to simultaneous interrogation of conductive lines of a digitizer sensor with orthogonal signals in accordance with some embodiments of the present invention. According to some embodiments of the present invention, at least two active lines are interrogated with orthogonal phase signals having a common frequency (block 910). According to some embodiments of the present invention, signals transmitted over the active lines are transferred by capacitive coupling to passive lines at junction points between the active line and the passive lines. According to some embodiments of the present invention, signals evoked on the passive lines are sampled in response to the interrogation (block 920). According to some embodiments of the present invention, signals on all passive lines are sampled simultaneously. According to some embodiments of the present invention, a phase correction is implemented to correct for phasor rotation as a function of position on the digitizer sensor (block 930). According to some embodiments of the present invention, outputs signal from the passive lines are decomposed into orthogonal components, e.g. real and imaginary components (block 940). According to some embodiments of the present invention, user interaction is determined on a corresponding junction through which the coupled signals are transferred in response to amplitude level differing from the base-line level (block 950). According to some embodiments of the present invention, an amplitude level below a base-line level is indicative of a fingertip interaction while an amplitude level above the base-line level is indicative of a token interaction.

Although the present invention has been described in reference to a digitizer sensor described in FIGS. 1-3, the present invention can be applied to other digitizer sensors and touchscreens, e.g. touchscreens.

The present invention is not limited to the technical description of the digitizer system described herein. The present invention may also be applicable to other digitized sensor and touch screens known in the art, depending on their construction.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A method for detection on a digitizer sensor, the method comprising:
   simultaneously transmitting orthogonal signals having a same frequency on at least two conductors of a digitizer sensor;
   sampling a signal on at least one other conductor crossing the at least two conductors, wherein the signal is responsive to capacitive coupling at cross-junctions formed between the at least two conductors and the at least one other conductor;
   decomposing the signal that is sampled into orthogonal components; and
   analyzing the orthogonal components to detect user interaction at each cross junction.

2. The method according to claim 1, comprising detecting a position of the user interaction on the digitizer sensor.

3. The method according to claim 1, wherein the orthogonal signals are orthogonal in phase.

4. The method according to claim 3, wherein the decomposing is performed by orthogonal phase detectors.

5. The method according to claim 1 comprising:
   estimating a phase shift of the orthogonal signals transmitted over a length of the at least two conductors; and
   shifting the phase of the signal that is sampled by the estimated phase shift.

6. The method according to claim 5 wherein the length of the at least two conductors comprises the length of said conductors between an input generator and cross-junctions with the at least one other conductor.

7. The method according to claim 5 wherein the estimated phase shift is the phase shift at a central point along the length of the at least two conductors.

8. The method according to claim 7, wherein the shifting is operative to provide maximum compensation of phase shift in a central area of the digitizer sensor and compensation of half the overall phase shift across the length of the at least two conductors at their endpoints.

9. The method according to claim 1, wherein the digitizer sensor is a grid based digitizer sensor and wherein the at least two conductors are conductive lines associated with a first axis of the grid based sensor and the at least one other conductor is a conductive line associated with a second axis of the grid based sensor orthogonal to the first axis.

10. The method according to claim 1, wherein the user interaction is detected by comparing an amplitude level of one of the orthogonal components and a signal level in the absence of the user interaction.

11. The method according to claim 1, wherein the user interaction is selected from a group including fingertip, hand and conductive object.

12. The method according to claim 1, wherein the user interaction is selected from a group including touch user interaction and hover user interaction.

13. The method according to claim 1, wherein the orthogonal signals transmitted to the at least two conductors are pulsed signals.

14. The method according to claim 1, wherein the orthogonal signals transmitted to the at least two conductors are AC signals.

15. A digitizer system comprising:
- a digitizer sensor comprising a first set of conductors and a second set of conductors that cross with the first set of conductors at cross junctions;
- a signal generator configured for providing first and second triggering signals at a pre-defined frequency to two conductors from the first set of conductors, wherein the first and second triggering signals are orthogonal signals;
- a controller configured for sampling an output signal from at least one conductor from the second set of conductors; and
- a processor configured for decomposing the output signal sampled from the at least one conductor from the second set of conductors into orthogonal components and for detecting user interactions on the cross junctions of the of the digitizer sensor based on the orthogonal components of the output signal sampled.

16. The system according to claim 15, wherein the output signal on the at least one conductor from second set of conductors is evoked from capacitive coupling at the cross junctions.

17. The system according to claim 15, wherein the processor is configured for detecting a position of the user interaction on the digitizer sensor.

18. The system according to claim 15 wherein the first and second triggering signals are orthogonal in phase.

19. The system according to claim 18, wherein the processor includes orthogonal phase detectors.

20. The system according to claim 15, wherein the processor includes a phase shift corrector configured for correcting phase of the output signal by a pre-determined phase shift of the triggering signal along a length of the two conductors.

21. The system according to claim 15, wherein the digitizer sensor is a grid based digitizer sensor and wherein the first set of conductors are conductive lines associated with a first axis of the grid based sensor and the second set of conductors are conductive lines associated with a second axis of the grid based sensor orthogonal to the first axis.

22. The system according to claim 15, wherein the user interaction is detected by comparing an amplitude level of one of the orthogonal components of the output signal and a signal level in the absence of user interaction.

23. The system according to claim 15, wherein the user interaction is selected from a group including fingertip, hand and conductive object.

24. The system according to claim 15, wherein the user interaction is selected from a group including touch user interaction and hover user interaction.

25. The system according to claim 15, wherein the first and second triggering signals are pulsed signals.

26. The system according to claim 15, wherein the first and second triggering signals are AC signals.

27. A method for user interaction detection on a digitizer, the method comprising:
- simultaneously transmitting orthogonal signals having the same frequency on at least two conductors of a digitizer sensor;
- sampling a signal on at least one other conductor crossing the at least two conductors, wherein the signal is responsive to capacitive coupling at cross-junctions formed between the at least two conductors and at least one other conductor; and
- determine multiple user interaction positions on the digitizer sensor from the sampled signal.

28. The method according to claim 27, wherein the orthogonal signals are orthogonal in phase.

29. The method according to claim 27, comprising:
- decomposing the sampled signal into orthogonal components; and
- analyzing the orthogonal components to determine the multiple user interaction positions.

30. The method according to claim 27, wherein the user interaction is selected from a group including fingertip, hand and conductive object.

31. The method according to claim 27, wherein the user interaction is selected from a group including touch user interaction and hover user interaction.

32. The method according to claim 27, wherein the digitizer sensor is a grid based digitizer sensor and wherein the at least two conductors are conductive lines associated with a first axis of the grid based sensor and the at least one other conductor is a conductive line associated with a second axis of the grid based sensor orthogonal to the first axis.

* * * * *

UNITED STATES PATENT AND TRADEMARK OFFICE
CERTIFICATE OF CORRECTION

PATENT NO. : 8,232,977 B2
APPLICATION NO. : 12/269971
DATED : July 31, 2012
INVENTOR(S) : Rafi Zachut et al.

Page 1 of 1

It is certified that error appears in the above-identified patent and that said Letters Patent is hereby corrected as shown below:

In Column 2, Claim 6, at line 35, delete "the" after "comprises".

Signed and Sealed this
Fourth Day of December, 2012

David J. Kappos
*Director of the United States Patent and Trademark Office*